(12) United States Patent
Youngblood et al.

(10) Patent No.: US 6,747,647 B2
(45) Date of Patent: *Jun. 8, 2004

(54) SYSTEM AND METHOD FOR DISPLAYING IMMERSIVE VIDEO

(75) Inventors: Paul A. Youngblood, Pacifica, CA (US); Vlad Margulis, Foster City, CA (US)

(73) Assignee: Enroute, Inc., Fremont, CA (US)

( * ) Notice: Subject to any disclaimer, the term of this patent is extended or adjusted under 35 U.S.C. 154(b) by 235 days.

This patent is subject to a terminal disclaimer.

(21) Appl. No.: 09/848,245

(22) Filed: May 2, 2001

(65) Prior Publication Data

US 2003/0006996 A1 Jan. 9, 2003

(51) Int. Cl.[7] .................... G06T 15/10; G06T 15/20
(52) U.S. Cl. ................................ 345/427; 345/676
(58) Field of Search ........................ 345/427, 676; 382/284, 154

(56) References Cited

U.S. PATENT DOCUMENTS

| | | | |
|---|---|---|---|
| 5,812,704 A | * 9/1998 | Pearson et al. | 382/284 |
| 5,850,352 A | 12/1998 | Moezzi et al. | |
| 6,009,190 A | * 12/1999 | Szeliski et al. | 382/154 |
| 6,011,558 A | * 1/2000 | Hsieh et al. | 345/435 |
| 6,128,108 A | * 10/2000 | Teo | 358/540 |
| 6,246,413 B1 | * 6/2001 | Teo | 345/419 |
| 6,278,466 B1 | 8/2001 | Chen | |
| 6,421,459 B1 | * 7/2002 | Rowe | 382/154 |
| 6,567,086 B1 | 5/2003 | Hashimoto | |
| 2001/0010555 A1 | * 8/2001 | Driscoll, Jr. | 348/335 |
| 2002/0021353 A1 | 2/2002 | DeNies | |
| 2002/0063709 A1 | * 5/2002 | Gilbert et al. | 345/427 |
| 2002/0140829 A1 | * 10/2002 | Colavin et al. | 348/231.99 |

* cited by examiner

*Primary Examiner*—Michael Razavi
*Assistant Examiner*—Faranak Fouladi
(74) *Attorney, Agent, or Firm*—Bever, Hoffmann & Harms, LLP; Edward S. Mao

(57) ABSTRACT

An immersive video system is provided which enables a user to interact with immersive video on a variety of platforms. To accommodate different types of platform components, the resolution of the immersive video may be changed. In one embodiment, a pair of immersive videos, one of the immersive videos having a 360° field of view, are simultaneously played in a standard display software program. In another embodiment, a single immersive video mapping an environment greater than 360° is played in a standard display software program. The display software program can be chosen such that it is supported by a variety of platforms. A view window associated with the standard display software program defines the portion of the immersive video shown to the viewer. A control adjusted by the viewer pans the view window around one of the pair of immersive videos.

17 Claims, 12 Drawing Sheets

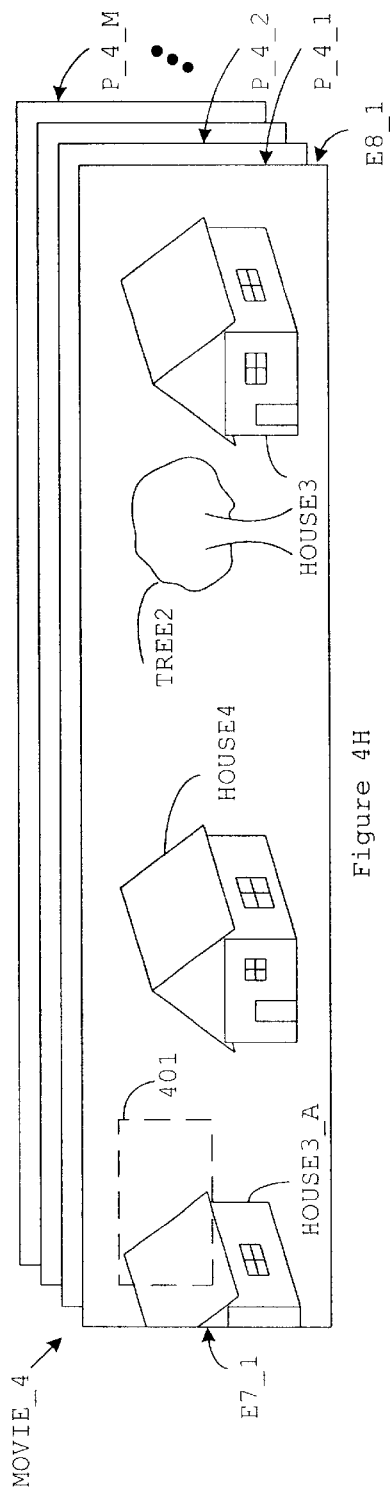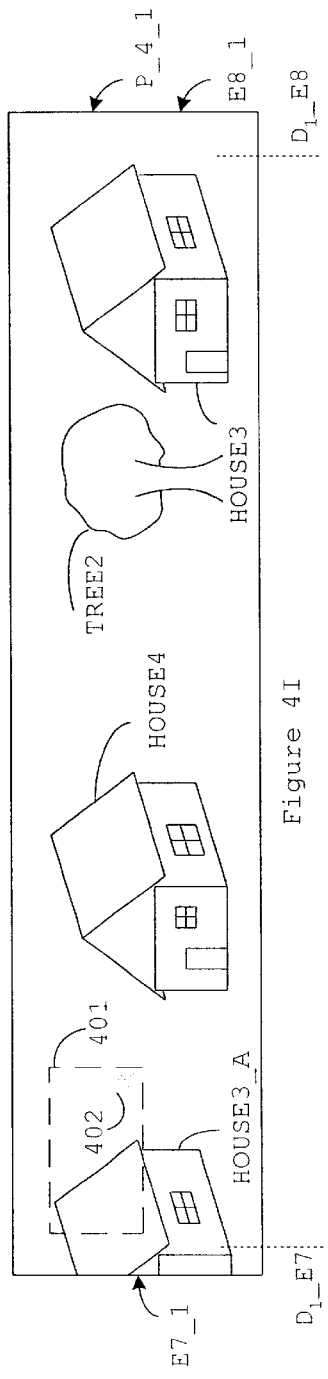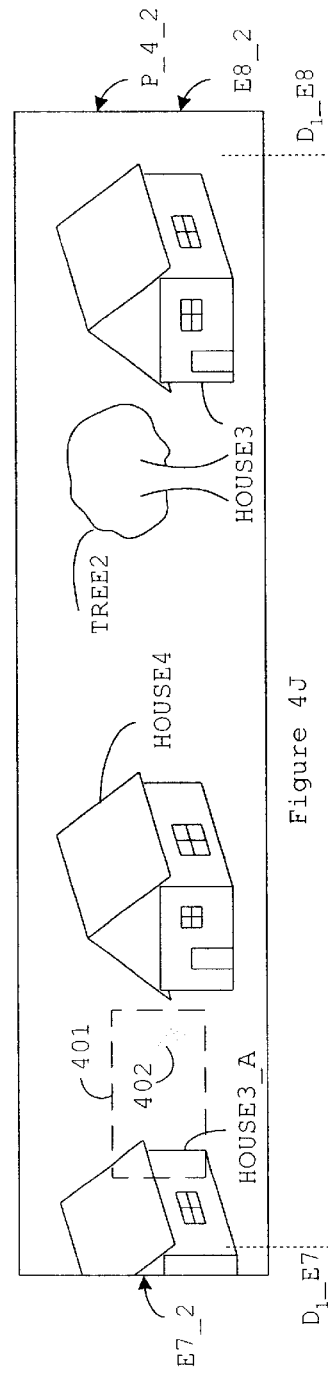

SYSTEM AND METHOD FOR DISPLAYING IMMERSIVE VIDEO

BACKGROUND OF THE INVENTION

1. Field of the Invention

The present invention relates to immersive video systems, and specifically to a system and method for displaying immersive videos.

2. Discussion of the Related Art

Immersive videos are moving pictures that in some sense surround a user and allows the user to "look" around at the content of the picture. Ideally, a user of the immersive video system can view the environment at any angle or elevation. A display system shows part of the environment map as defined by the user or relative to azimuth and elevation of the view selected by the user. Immersive videos can be created using environment mapping, which involves capturing the surroundings or environment of a theoretical viewer and rendering those surroundings into an environment map.

Current implementations of immersive video involve proprietary display systems running on specialized machines. These proprietary display systems inhibit compatibility between different immersive video formats. Furthermore, the use of specialized machines inhibits portability of different immersive video formats. Types of specialized machines include video game systems with advanced display systems and high end computers having large amounts of random access memory (RAM) and fast processors.

FIG. 1A is a representation of a 360° immersive picture P_1, i.e. an environment map. The entire field of view in immersive picture P_1 shows a tree TREE1, a house portion HOUSE1_A, a house portion HOUSE1_B, and a full house HOUSE2. Because memory is arranged in a two-dimensional array, immersive picture P_1 is stored as a two-dimensional array in memory. Thus, the data along edge E1 is not directly correlated to the data from edge E2. As a result, house portions HOUSE1_A and HOUSE1_B, which in the environment of a centrally located theoretical viewer (not shown) are joined into a full house HOUSE_1, are instead separated when immersive picture P_1 is stored in memory. Immersive pictures, such as 360° immersive picture P_1, should represent a three-dimensional (e.g. cylindrical) space. As a result, in displaying immersive picture P_1, the two-dimensional representation of FIG. 1A must be converted to a three-dimensional representation.

FIG. 1B is a cylindrical representation of immersive picture P_1 of FIG. 1A. Seam S_1 is formed from joining edges E1 and E2 together to form this cylindrical representation from the two-dimensional representation of immersive picture P_1 shown in FIG. 1A. When edges E1 and E2 are joined as shown, house portions HOUSE1_A and HOUSE1_B are joined into full house HOUSE_1. Thus, seam S_1 runs through full house HOUSE1 and is the dividing line between the house portion HOUSE1_A and the house portion HOUSE1_B. Tree TREE1, located on the door side of house portion HOUSE1_B, is also shown.

FIG. 1C is a conceptual cylindrical representation of the 360° immersive picture P_1 of FIG. 1A. The contents of immersive picture P_1 are omitted for clarity. This conceptual cylindrical representation indicates the perception of a theoretical viewer looking at immersive picture P_1 from the vantage point of a location VIEWPOINT, located within the cylinder formed by immersive picture P_1. Immersive picture P_1 is a 360° immersive picture having a first edge E1 and a second edge E2. Similarly to FIG. 1B, seam S_1 results from the joining of the two-dimensional representation (FIG. 1A) edges E1 and E2 in the cylindrical representation.

A view window 101 represents the portion of immersive picture P_1 visible to the user at location VIEWPOINT. View window 101 is centered at the origin of a three dimensional space having x, y, and z coordinates, where z (not shown) is perpendicular to the plane of the page. Similarly, the environment surrounding the user located at the location VIEWPOINT is represented by the cylindrical representation of immersive picture P_1 that is centered at the location VIEWPOINT. View window 101 is typically displayed on a display unit for the user of the immersive video system. Thus, only the portion of immersive picture 1 visible to the user, rather than the entire picture content, is displayed, for example, on a television screen.

By moving view window 101 (e.g. left or right) relative to immersive picture P_1, the portion of immersive picture P_1 visible to the user may be changed. This relative movement of view window 101 with respect to immersive picture P_1 is called panning. By moving view window 101 clockwise 360°, the entire circumference of immersive picture P_1 may be traversed. A cursor 102 within view window 101 is controlled by the user and indicates the desired direction of panning. Cursor 102 is located to the seam S_1 side of view window 101 in FIG. 1C.

FIGS. 1D and 1E are a cylindrical representation of the 360° immersive picture P_1 of FIG. 1C rotated clockwise a first and second amount, respectively. Again, the contents of immersive picture P_1 are omitted for clarity. Because cursor 102 is located to the seam S_1 side of view window 101, immersive picture P_1 has panned clockwise with respect to view window 101 from FIG. 1C.

FIG. 1E shows seam S_1 as visible within view window 101. As described above, immersive picture P_1 is stored two-dimensionally in memory, therefore, the data for edge E1 is not directly correlated to the data from edge E2. As a result, when panning across seam S_1, the data from edges E1 and E2 must be joined before being shown to the user on a display as a whole picture. Because real-time picture display systems can't join images fast enough to display seams, it is preferable not to display seam S_1 in view window 101. It would be desirable to have a method of panning across a picture having seams without real-time seam distortion visibly showing in the view window.

Accordingly, there is a need to deliver an immersive video experience across many different non-specialized platforms while minimizing distortion created by real-time joining of picture seams in the field of view.

SUMMARY OF THE INVENTION

In accordance with the present invention, an immersive video system is provided which enables a user to interact with an immersive video on a variety of platforms. To accommodate different types of components found on different platforms, the resolution of the immersive video may be changed to adapt to different amounts of random access memory (RAM) on a given platform.

In one embodiment, a pair of cylindrically defined 360° immersive videos are simultaneously played in a standard display software program. These two immersive videos are created such that seams in one video are separated from seams in the second video by at least an amount equal to the length of the view window. The display software program can be chosen such that it is supported by a variety of platforms. For example, choosing Macromedia™ Flash as a display software program allows playback on any platform supporting Flash. A view window associated with the standard display software program defines the portion of the immersive video shown to the viewer. A control mechanism adjusted by the user pans the view window around one of the pair of immersive videos. Panning is the act of moving a point of view in a particular direction (e.g. left of right). Because two immersive videos having different seams are simultaneously played, the view window may select to display a portion of the video without the seam. Thus, if the view window approaches a seam while displaying a portion of a first video, the view window is changed to display a similar portion of a second identical video that has no seam in that location.

In another embodiment, a cylindrically defined immersive video representing an environment map larger than 360° (e.g. 420°) is played in a standard display software program. The overlapping portion of this immersive video (i.e. the portion greater than 360°) is used to avoid displaying picture seams (or picture edges) to the user.

BRIEF DESCRIPTION OF THE DRAWINGS

FIG. 4H is a representation of a two-dimensional time sequenced video environment map larger than 360° degrees in accordance with the embodiment of FIG. 4A.

FIGS. 4I and 4J are two-dimensional representations of two immersive pictures in the time sequence video environment map of FIG. 4H.

Similar elements in the above Figures are labeled similarly.

DETAILED DESCRIPTION OF THE DRAWINGS

In accordance with the present invention, a cross-platform immersive video system is described that allows panning during playback of an immersive video. The use of panning in conjunction with a moving picture allows a real-world, inclusive experience for the user. Multiple immersive videos (e.g. 2 videos) are simultaneously displayed to compensate for distortion in the view window along video seams. Video seams are the point of combination of video filmed from two or more separate cameras.

A standard display software program (e.g. Macromedia™ Flash) is chosen in conjunction with a specific platform (e.g. a standard PC). The immersive video system is then adapted to requirements of that standard display software program. As a result, an immersive video system according to the present invention is made non-proprietary, thereby supporting the use of different platforms. This immersive video system is described in more detail below.

Figure 1A:
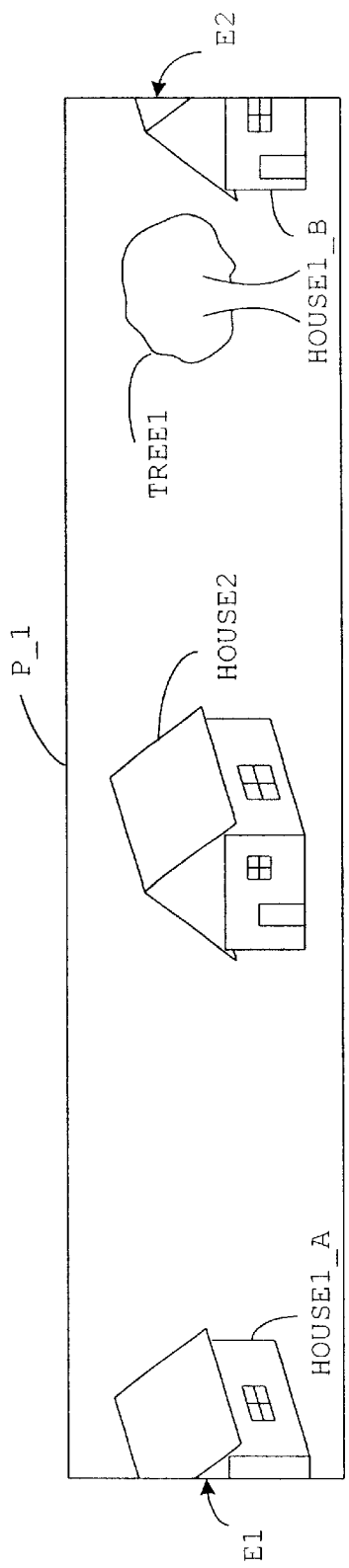
FIG. 1A is a representation of a 360° immersive picture.
Figure 1B:
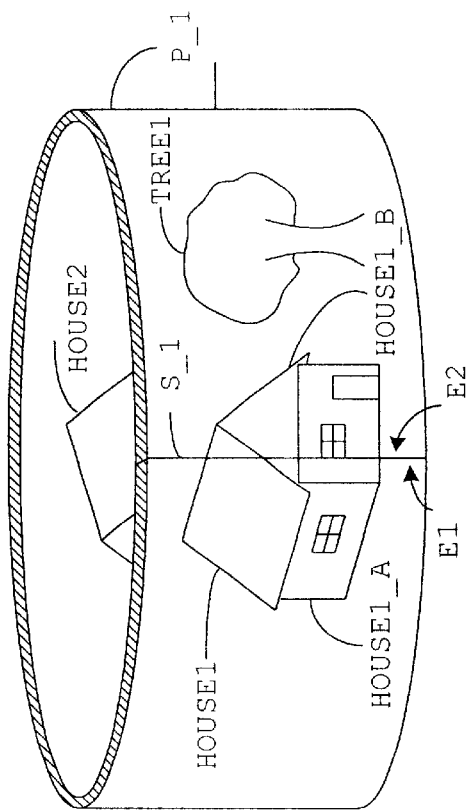
FIGS. 1B–1E are cylindrical representations of a 360° immersive picture.
Figure 1C:
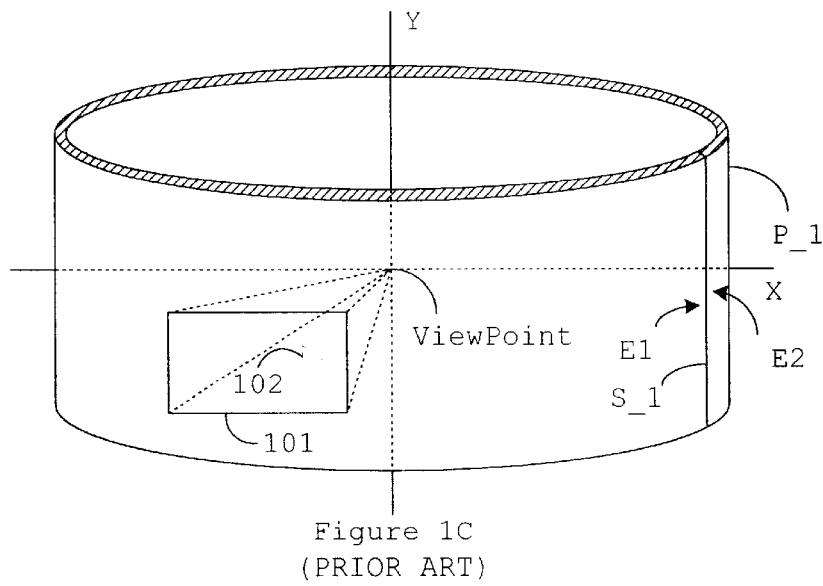
Figure 1D:
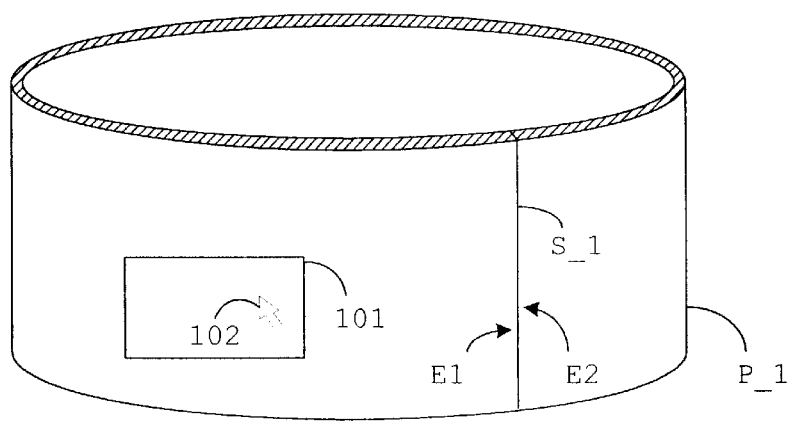
Figure 1E:
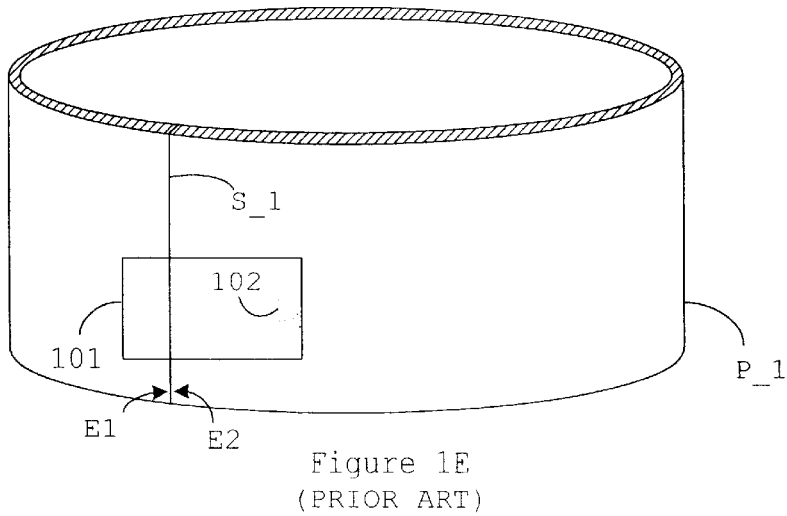
Figure 2A:
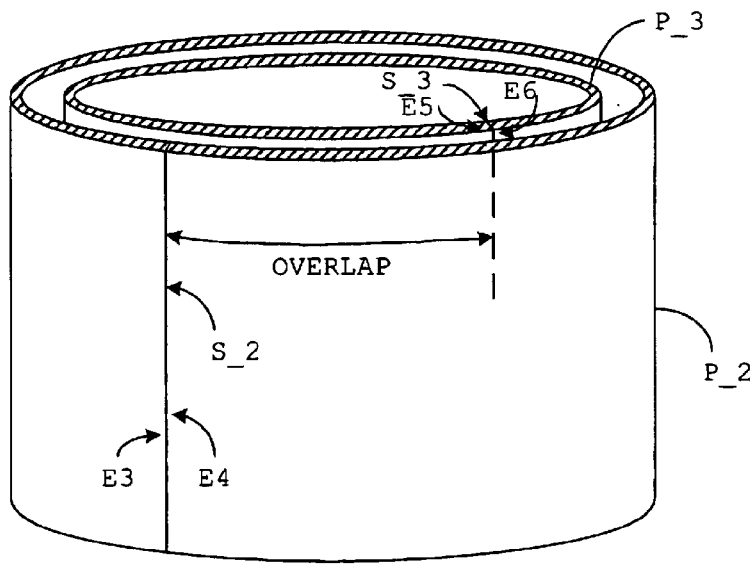
FIG. 2A is a cylindrical representation of the coverage of two 360° immersive videos in accordance with one embodiment of the present invention.

FIG. 2A is a cylindrical representation of two 360° immersive pictures in accordance with one embodiment of the present invention. Immersive picture P_2 is a 360° immersive picture having a first edge E3 and a second edge E4. A seam S_2 in immersive picture P_2 occurs where the edges E3 and E4 meet. Simultaneously played immersive picture P_3 is a 360° immersive picture having a first edge E5 and a second edge E6. Similarly, immersive picture P_3 has a seam S_3 where edges E5 and E6 meet. Immersive pictures P_2 and P_3 are identical but for the location of seams S_2 and S_3 with respect to the picture content. Seams S_2 and S_3 are separated by an overlap distance OVERLAP.

While immersive picture P_3 is depicted "inside" immersive picture P_2, in effect immersive pictures P_2 and P_3 are co-located. However, in the present embodiment, only one of simultaneously played immersive pictures P_2 and P_3 will be displayed to a user at any given time.

Figure 2B:
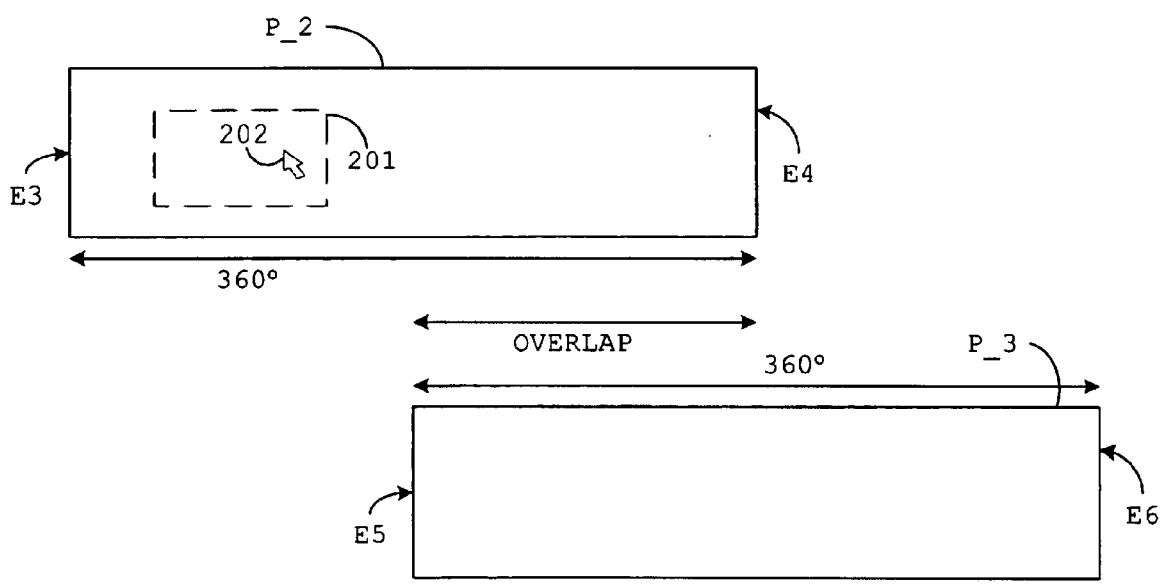
FIG. 2B is a two-dimensional representation of the coverage of two 360° immersive videos in accordance with the embodiment of FIG. 2A.

FIG. 2B is a two-dimensional representation of the coverage of two 360° immersive pictures P_2 and P_3 in accordance with the embodiment of FIG. 2A. Immersive pictures P_2 and P_3 are two-dimensional so that they may be stored in conventional two-dimensional memory. Immersive picture P_2 is made two-dimensional by separation along seam S_2. Similarly, immersive picture P_3 is made two-dimensional by separation along seam S_3. As shown, an overlap distance OVERLAP is the distance between edge E5 (at seam S_3 in FIG. 2A) and edge E4 (at seam S_2 in FIG. 2A), which represents the amount of overlap between the seams of immersive pictures P_2 and P_3.

Immersive pictures P_2 and P_3 may be applied to a standard display software program to provide interactivity with a user. The standard display software program provides a view window 201, which effectively defines the user's field of view. Thus, the portion of immersive picture P_2 or P_3 that is visible to a user is that portion of the picture bounded by view window 201. Cursor 202 provides the control mechanism for the user to pan around immersive picture P_2 or P_3.

Figure 3A:
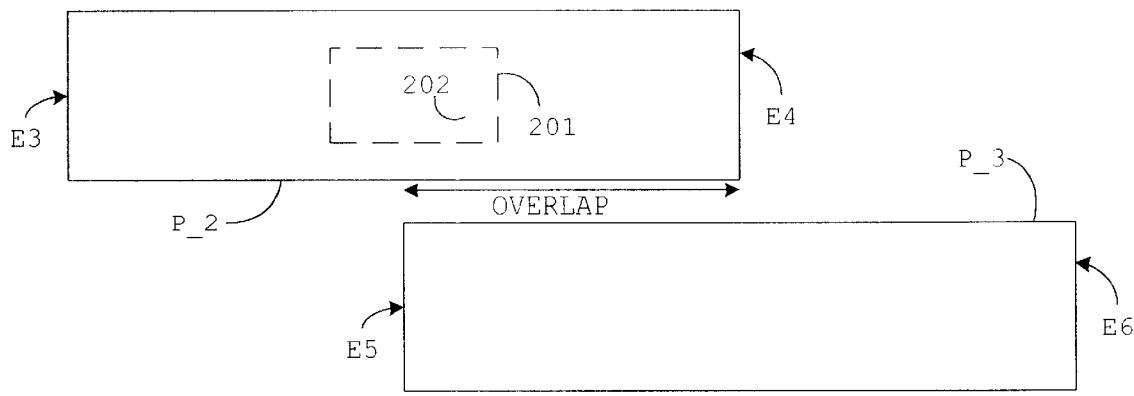
FIGS. 3A–3C are two-dimensional representations of the coverage of two 360° immersive pictures in accordance with the embodiment of FIG. 2B.
Figure 3B:
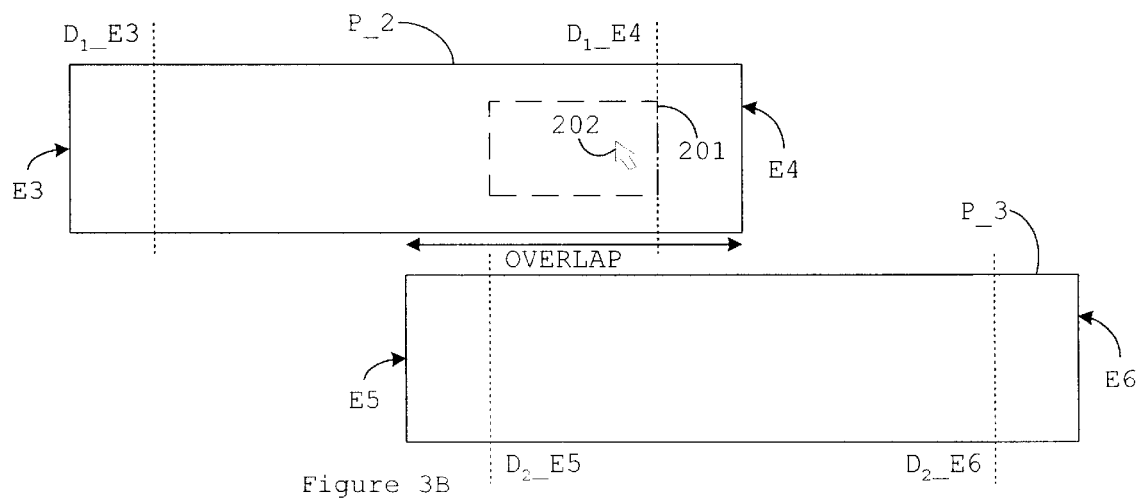
Figure 3C:
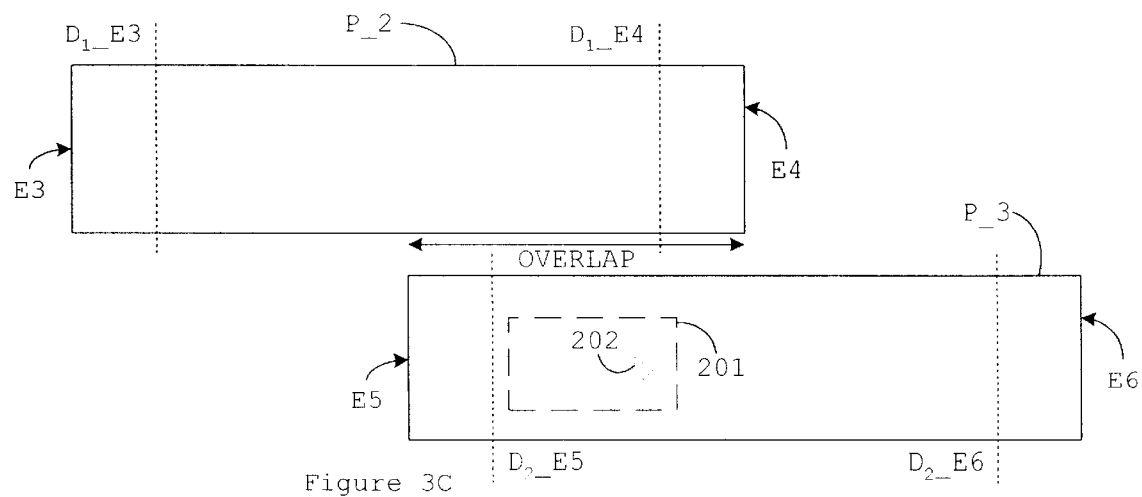

FIGS. 3A–3C are two-dimensional representations of the coverage of two 360° immersive pictures P_2 and P_3 in accordance with the embodiment of FIG. 2B. As shown, the overlap distance OVERLAP is the distance between edge E5 and edge E4, which represents the amount of overlap between seams S_2 and S_3 (FIG. 2A). Cursor 202, which is located towards the edge E4 side of view window 201, causes view window 201 to pan towards edge E4. In response, view window 201 moves in relation to immersive picture P_2 as shown in FIG. 3B.

FIG. 3B shows view window 201 located in the area of overlap between edges E4 and E5. To prevent real-time seam distortion from appearing in view window 201, a distance $D_1\_E4$ is defined relative to edge E4 such that when view window 201 is panning toward edge E4 and reaches the distance $D_1\_E4$ from edge E4, view window 201 will cease displaying immersive picture P_2 and will instead display immersive picture P_3 (FIG. 3C). Because immersive picture P_3 is identical to immersive picture P_2 except that seam S_3 (FIG. 2A) of immersive picture P_3 is located in a different portion of immersive picture P_3 relative to the picture content than seam S_2 of immersive picture P_2 (FIG. 2A), the picture shown to the user through view window 201 will be free of real-time seam distortion. That is, rather than showing a portion of immersive picture P_2 including seam S_2 (FIG. 2A), a portion of immersive picture P_3 (having identical content but no seam) is shown.

Similar distances $D_1\_E3$, $D_2\_E5$, and $D_2\_E6$ are defined such that when view window 201 is panning towards edges E3, E5, and E6, respectively, the picture shown through view window 201 is changed when reaching that distance from the respective edge to prevent display of the seam of a picture. The overlap distance OVERLAP is greater than the length of view window 201 plus $D_1\_E4\ D_2\_E5$ as well as greater than the length of view window 201 plus $D_1\_E3\ D_2\_E6$ to allow for proper transition of pictures. In this way, real-time seam distortion is eliminated from the user's field of view by the simultaneous use of two identical pictures having different seam locations.

Figure 4A:
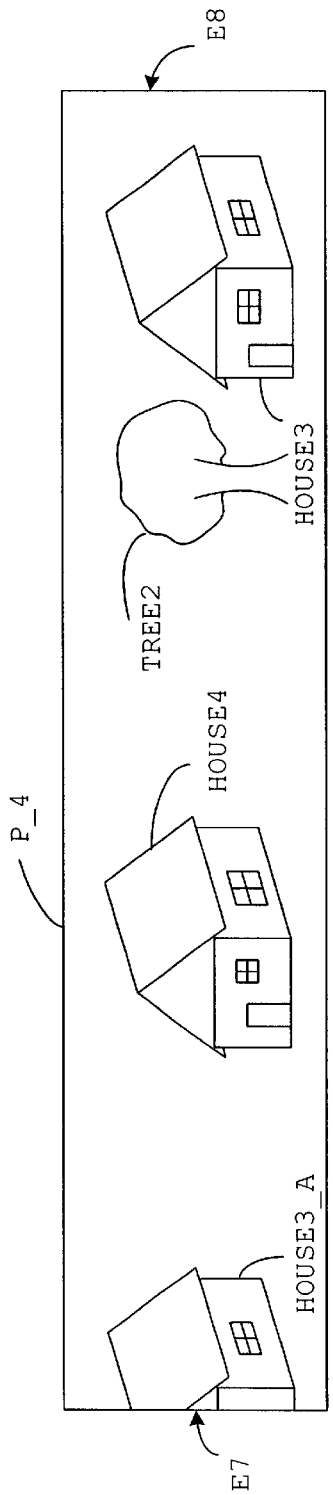
FIG. 4A is a two-dimensional representation of an environment map larger than 360° in accordance with an embodiment of the present invention.

FIG. 4A is a representation of an immersive picture P_4 that is an environment map greater than 360°. For example, immersive picture P_4 may be 390°, having 30° of overlapping picture content, or 420°, having 60° of overlapping picture content. The field of view in immersive picture P_4 shows a tree TREE2, a full house HOUSE3, a full house HOUSE4, and a house portion HOUSE3_A. As described above, because memory is arranged in a two-dimensional array, immersive picture P_4 is stored as a two-dimensional array in memory. Because the picture content is greater than 360°, some objects represented within immersive picture P_4 are repeated. For example, the rightmost portion of full house HOUSE3 is repeated as house portion HOUSE3_A. In displaying immersive picture P_4, the two-dimensional representation of FIG. 4A is converted to a cylindrical representation.

Figure 4B:
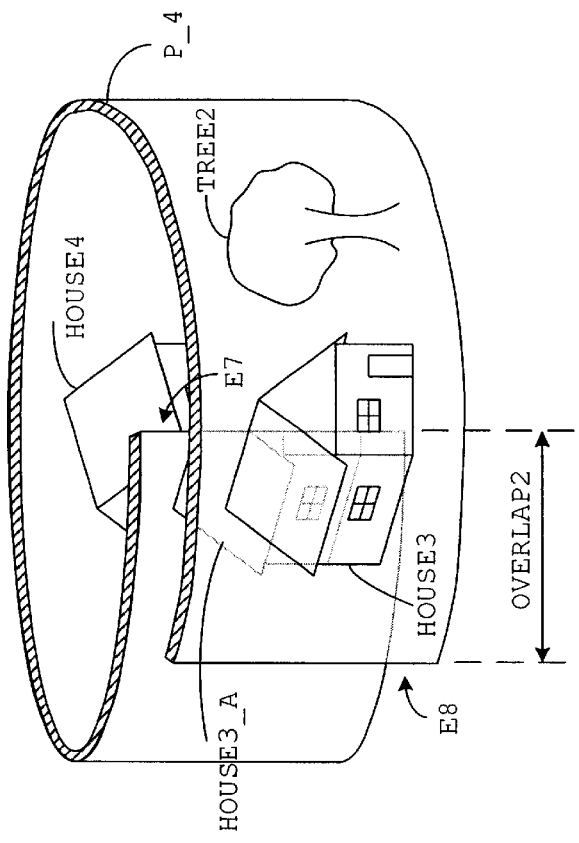
FIG. 4B is a cylindrical representation of an environment map larger than 360° in accordance with the embodiment of FIG. 4A.

FIG. 4B is a cylindrical representation of immersive picture P_4 of FIG. 4A. Immersive picture P_4 near edge E8 depicts full house HOUSE3 and tree TREE2. House portion HOUSE3_A is depicted near edge E7 of immersive picture P_4. Full house HOUSE2 is shown around the back side of the cylinder. An overlap distance OVERLAP2 represents the amount of overlap in picture content between edges E7 and E8. Thus, if immersive picture P_4 is 390°, having 30° of overlapping picture content, then the overlap distance OVERLAP2 is 30°. The content of immersive picture P_4 in the area from edge E7 a distance back along immersive picture P_4 is repeated in the area from edge E8 a distance forward along immersive picture P_4. While FIG. 4B depicts immersive picture P_4 as being split along the overlap distance OVERLAP2 for clarity, the overlapping picture content is instead essentially co-located.

Figure 4C:
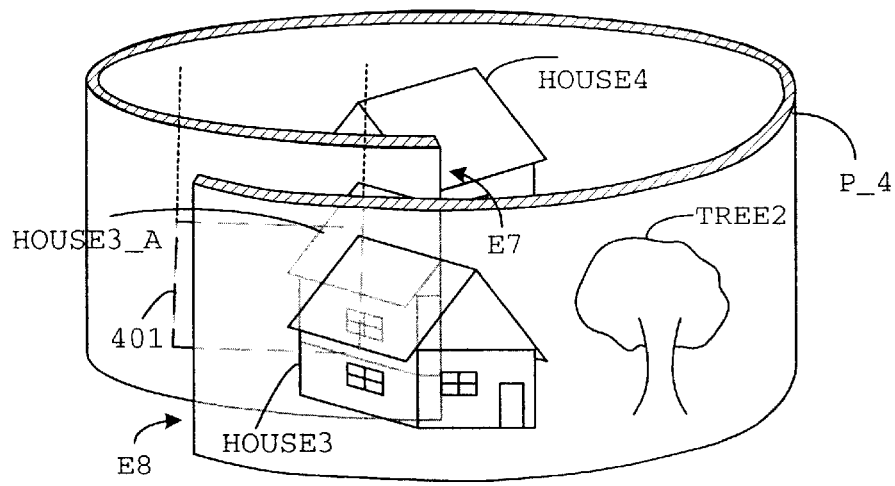
FIGS. 4C–4E are cylindrical representations of an environment map larger than 360° in accordance with the embodiment of FIG. 4B.
Figure 4D:
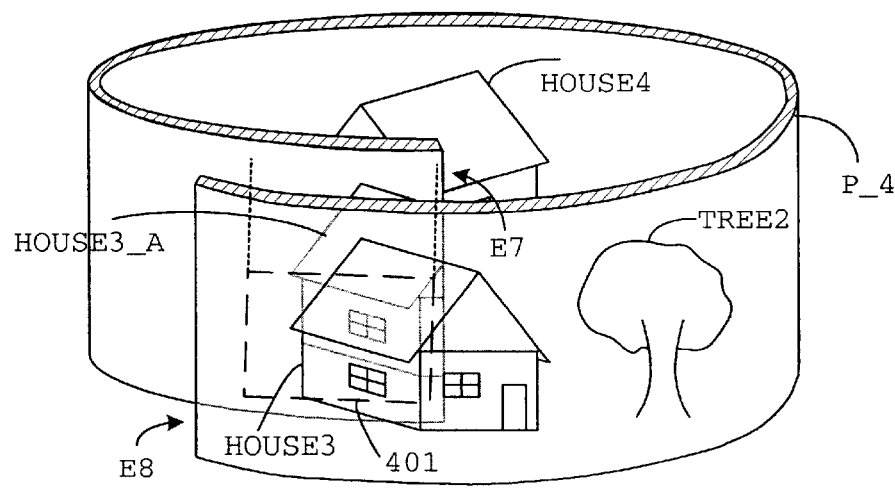
Figure 4E:
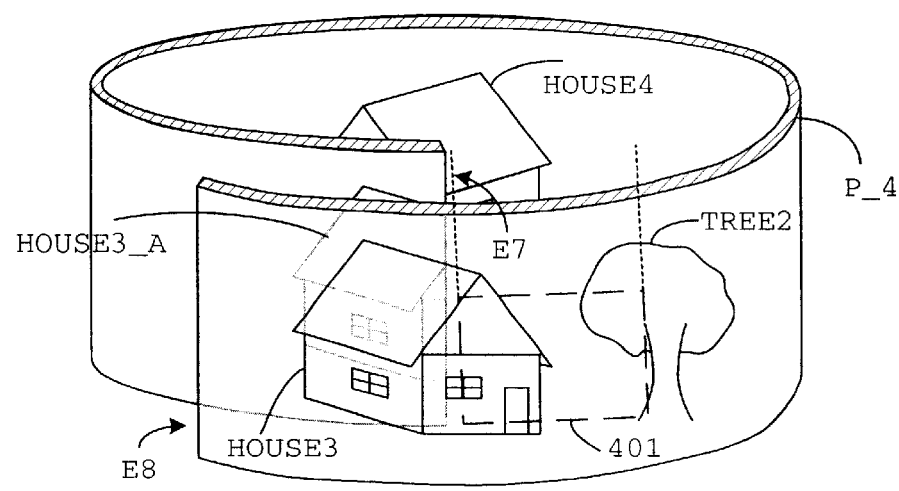

FIGS. 4C–4E are cylindrical representations of immersive picture P_4 of FIG. 4B at various angles of view. A view window 401 displays the portion of the picture content of immersive picture P_4 that is bordered by view window 401. Thus, FIG. 4C depicts view window 401 at a first point in time, at which time view window 401 depicts the content of immersive picture P_4 near edge E7. As a result, view window 401 depicts a portion of house portion HOUSE3_A. As view window 401 is moved towards edge E7, a point is reached where the content within the boundaries of view window 401 is repeated near the edge E8 side of immersive picture P_4. At this point, view window 401 may display that content from the portion of immersive picture P_4 near edge E7 or from the portion of immersive picture P_4 near edge E8. Therefore, to prevent view window 401 from reaching edge E7 of immersive picture P_4, the portion of the picture content of immersive picture P_4 is changed from the portion near edge E7 to the portion near edge E8. Specifically, view window 401 changes from depicting a portion of house portion HOUSE3_A to depicting a portion of full house HOUSE3. This change in view window content is shown more clearly in FIG. 4D.

FIG. 4D depicts view window 401 at a second point in time, at which time view window 401 depicts the contents of immersive picture P_4 near edge E8. As a result, view window depicts a portion of full house HOUSE3. As view window 401 moves away from edge E8 (i.e. towards edge E7) the content of immersive picture P_4 bordered by view window 401 changes. FIG. 4E depicts view window 401 at a third point in time, at which time view window 401 depicts another portion of full house HOUSE3 and a portion of tree TREE2.

Figure 4F:
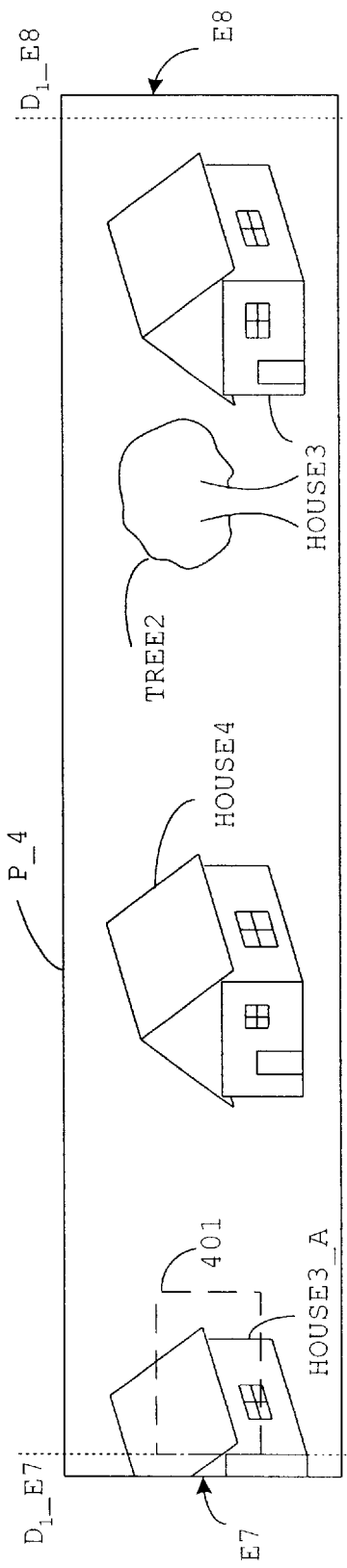
FIGS. 4F and 4G are representations of two-dimensional time sequenced environment maps larger than 360° degrees in accordance with the embodiment of FIG. 4A.
Figure 4G:
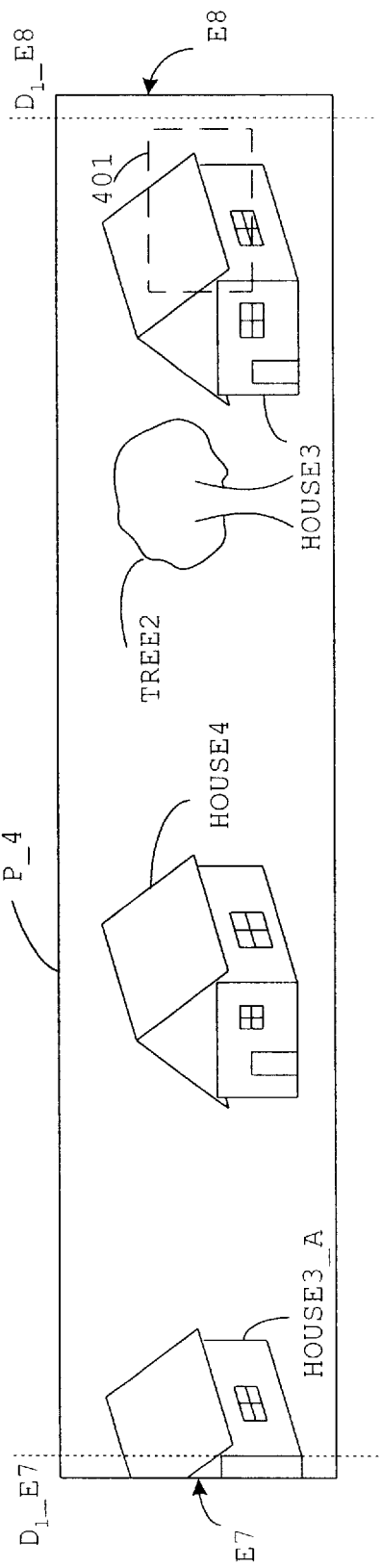

FIGS. 4F and 4G are two-dimensional representations of the coverage of immersive pictures P_4 in accordance with the embodiment of FIG. 4A. FIG. 4F shows view window 401 located in the area of repeated picture content near edge E7. To traversing edge E7 within view window 401, a distance $D_1\_E7$ is defined relative to edge E7 such that when view window 401 is panning toward edge E7 and reaches the distance $D_1\_E7$ from edge E7, view window 401 will cease displaying the portion of immersive picture P_4 near edge E7 and will instead display the repeated portion of immersive picture P_4 near edge E8 as described with respect to FIGS. 4C and 4D. Because the content of immersive picture P_4 is repeated near edges E7 and E8, the picture shown to the user through view window 401 will not cross an edge of immersive picture P_4 (and thus is free of real-time seam distortion).

FIG. 4H is a two-dimensional representation of a time sequenced immersive video in accordance with the embodiment of FIG. 4A. Movie MOVIE_4 includes M (e.g. M=30) sequential immersive pictures, immersive pictures P_4_1-P_4_M. Immersive picture P_4_2 is one time step (e.g. one-thirtieth of a second) behind immersive picture P_4_1 (i.e. immersive picture P_4, FIG. 4A). Similarly immersive picture P_4_3 is one time step behind immersive picture P_4_2. In one embodiment, movie MOVIE_4 is comprised of self-contained sequential bitmaps.

Similar to FIGS. 4C–4G, view window 401 pans around movie MOVIE_4 in response to user input. However, because movie MOVIE_4 is comprised of a series of sequential pictures, each time step a different, time related picture is shown in view window 401. In other words, while the user is panning within movie MOVIE_4, the user is actually panning through time as well as around a picture. For example, in the first time period a first portion of immersive picture P_4_1 is shown. Panning towards edge E8_1 the first time period later, view window 401 will contain the portion of immersive picture P_4_2 in the direction of edge E8_of immersive picture P_4_1. This example is shown more clearly in FIGS. 4I and 4J.

FIG. 4I is the first in a series of sequential pictures for movie MOVIE_4 in accordance with the embodiment of FIG. 4H. Cursor 402 is causing view window 401 to pan down and towards edge E8_1 of immersive picture P_4_1 of movie MOVIE_4. A first time period later, view window 401 has moved in the direction of edge E8_1. However, because a movie rather than a single picture is displayed, the actual picture displayed through view window 401 is immersive picture P_4_2 of movie MOVIE_4. Thus, panning has occurred both within a picture (moving through immersive picture P_4_1 while it is displayed) and through time (continuing to pan through immersive picture P_4_2 when it is displayed in place of immersive picture P_4_1).

To prevent real-time seam distortion from appearing in view window 401, a distance $D_1\_E7$ is defined relative to edges E7_1-E7_2, similarly to that described for FIGS. 4F and 4G, such that when view window 401 is panning toward edge E7_2 and reaches the distance $D_1\_E7$ from edge E7_2, view window 401 will move to display the repeated content near edge E8_2. Because the content is repeated near the edges in immersive picture P_4_2, the picture shown to the user through view window 401 will be free of real-time seam distortion. In this way, real-time seam distortion is eliminated from the user's field of view by the simultaneous use of two identical movies having different seam locations.

Figure 5:
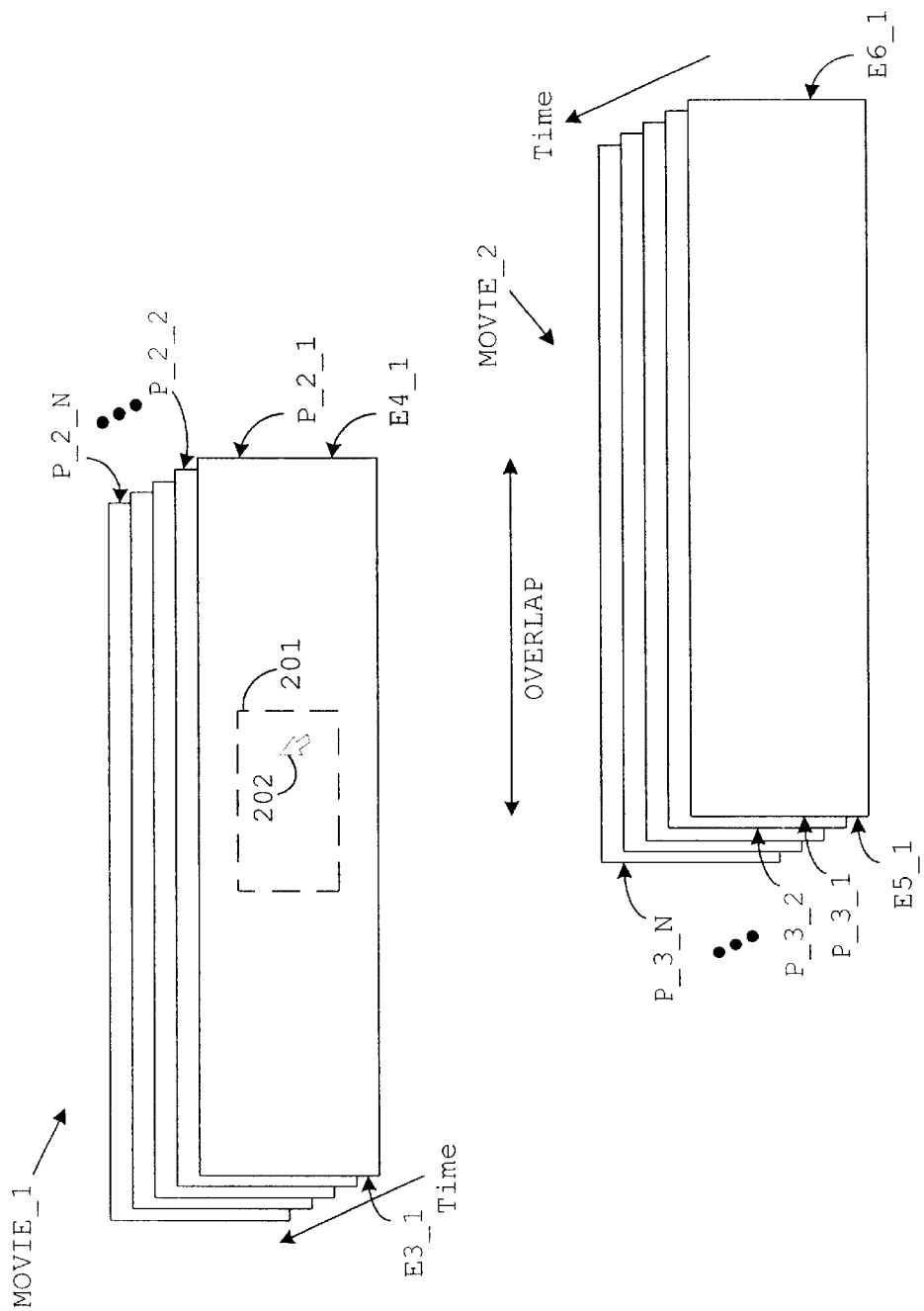
FIG. 5 is a two-dimensional representation of a two time sequenced 360° immersive videos in accordance with the embodiment of FIG. 2A.

FIG. 5 is a two-dimensional representation of a two time sequenced 360° immersive videos in accordance with the embodiment of FIG. 2A. Movies MOVIE_1 and MOVIE_2 include N (e.g. N=30) sequential immersive pictures each, immersive pictures P_2_1-P_2_N and P_3_1-P_3_N, respectively. Immersive picture P_2_2 is one time step (e.g. one-thirtieth of a second) behind immersive picture P_2_1 (i.e. immersive picture P_2, FIG. 2A). Similarly immersive picture P_2_3 is one time step behind immersive picture P_2_2. Immersive picture P_3_2 is one time step (e.g. one-thirtieth of a second) behind immersive picture P_3_1 (i.e. immersive picture P_3, FIG. 2A). Immersive pictures P_2_3-P_2_N and P_3_2-P_3_N are similarly related in time. In one embodiment, movies MOVIE_1 and MOVIE_2 are comprised of self-contained sequential bitmaps.

Similar to FIGS. 3A–3C, view window 201 pans around movies MOVIE_1 and MOVIE_2 in response to user control of cursor 202. However, because movies MOVIE_1 and MOVIE_2 are comprised of a series of sequential pictures, each time period a different time-related picture is shown in view window 201. In other words, while the user is panning within movie MOVIE_1, the user is actually panning through time as well as around a picture. For example, in the first time period a first portion of immersive picture P_2_1 is shown. Panning towards edge E4_1 the first time period later, view window 201 will contain the portion of immersive picture P_2_2 in the direction of edge E4 of immersive picture P_2_1. This example is shown more clearly in FIGS. 6A–6C.

Figure 6A:
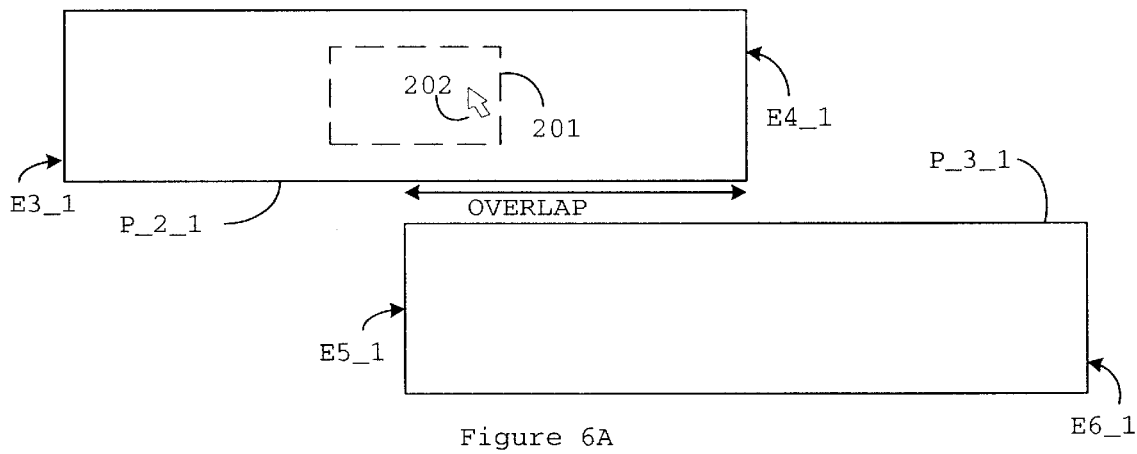
FIGS. 6A–6C are two-dimensional representations of a three pictures in two 360° immersive videos in accordance with the embodiment of FIG. 2A.

FIG. 6A is the first in a series of sequential pictures for movies MOVIE_1 and MOVIE_2 in accordance with the embodiment of FIG. 5. Cursor 202 is causing view window 201 to pan towards edge E4_1 of immersive picture P 2_1 of movie MOVIE_1. A first time period later, view window 201 has moved in the direction of edge E4_1. However, because a movie rather than a single picture is displayed, the actual picture displayed through view window 201 is immersive picture P_2_2 of movie MOVIE_1. Thus, panning has occurred both within a picture (moving through immersive picture P_2_1 while it is displayed) and through time (continuing to pan through immersive picture P_2_2 when it is displayed in place of immersive picture P_2_1).

Figure 6B:
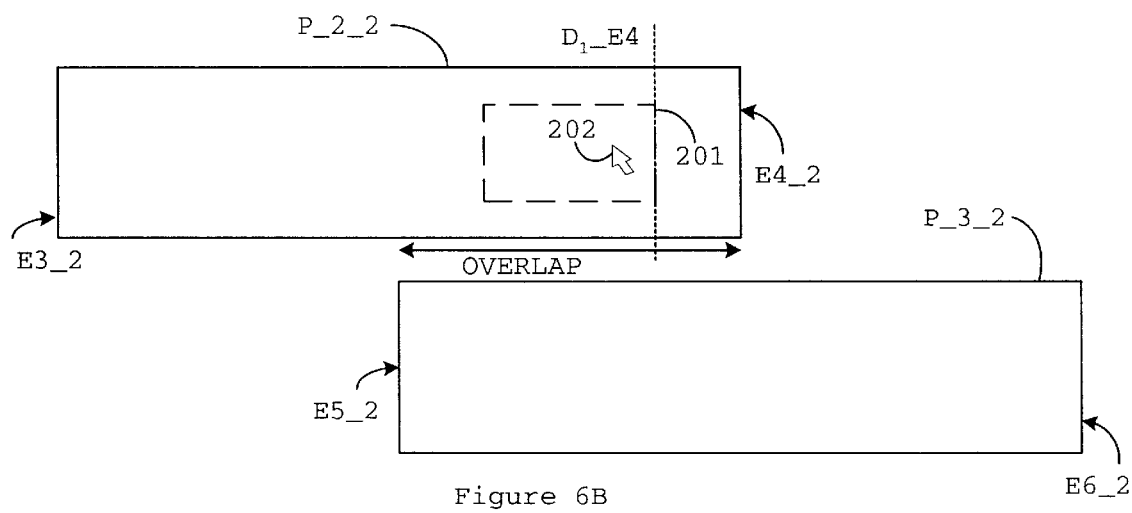
Figure 6C:
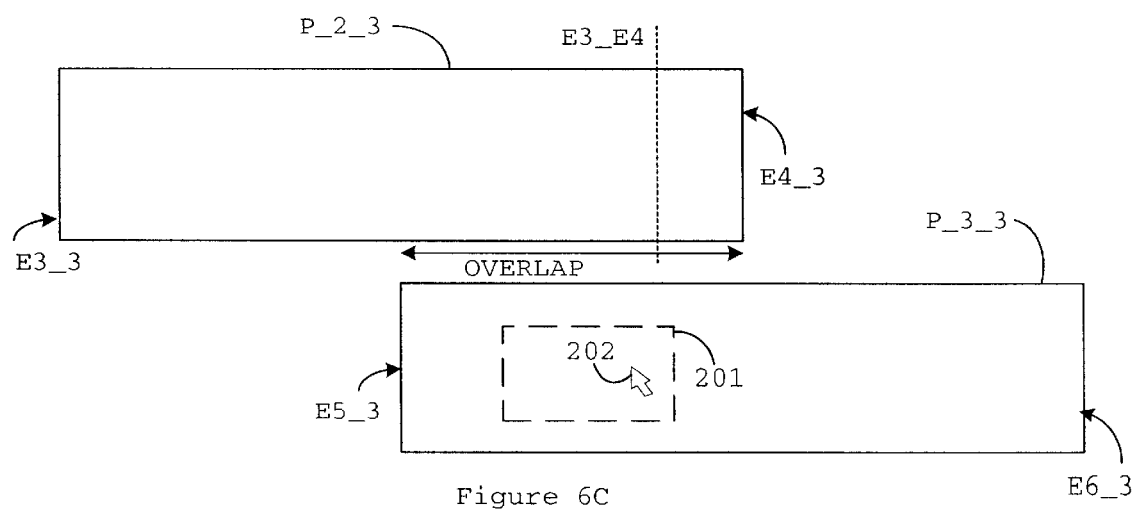

To prevent real-time seam distortion from appearing in view window 201, a distance $D_1\_E4$ is defined relative to edges E4_1–E4_3 such that when view window 201 is panning toward edge E4_2 and reaches the distance $D_1\_E4$ from edge E4_2, view window 201 will cease displaying immersive picture P_2_2 and will instead display immersive picture P_3_2 (FIGS 6B and 6C). Because immersive picture P_3_2 is identical to immersive picture P_2_2 except that the seam of immersive picture P_3_2 is located in a different portion of immersive picture P_3_2 than the edge of immersive picture P_2_1 (similar to FIG. 2A), the picture shown to the user through view window 201 will be free of real-time seam distortion. Similar distances are defined relative to other edges for the other pictures in movies MOVIE_1 and MOVIE_2 (FIG. 5). In this way, real-time seam distortion is eliminated from the user's field of view by the simultaneous use of two identical movies having different seam locations.

In one embodiment, one of both sets of pictures comprising movies MOVIE_1 and MOVIE_2 contain less than a 360 degree field of view. In this embodiment, the seams of movies MOVIE_2 are offset from the seams of movie MOVIE_1 by at least the width of the view window.

Appendix I, found at the end of the present document, is a sample code for implementing an embodiment of the present invention in the Macromedia™ Flash standard display software.

Figure 7:
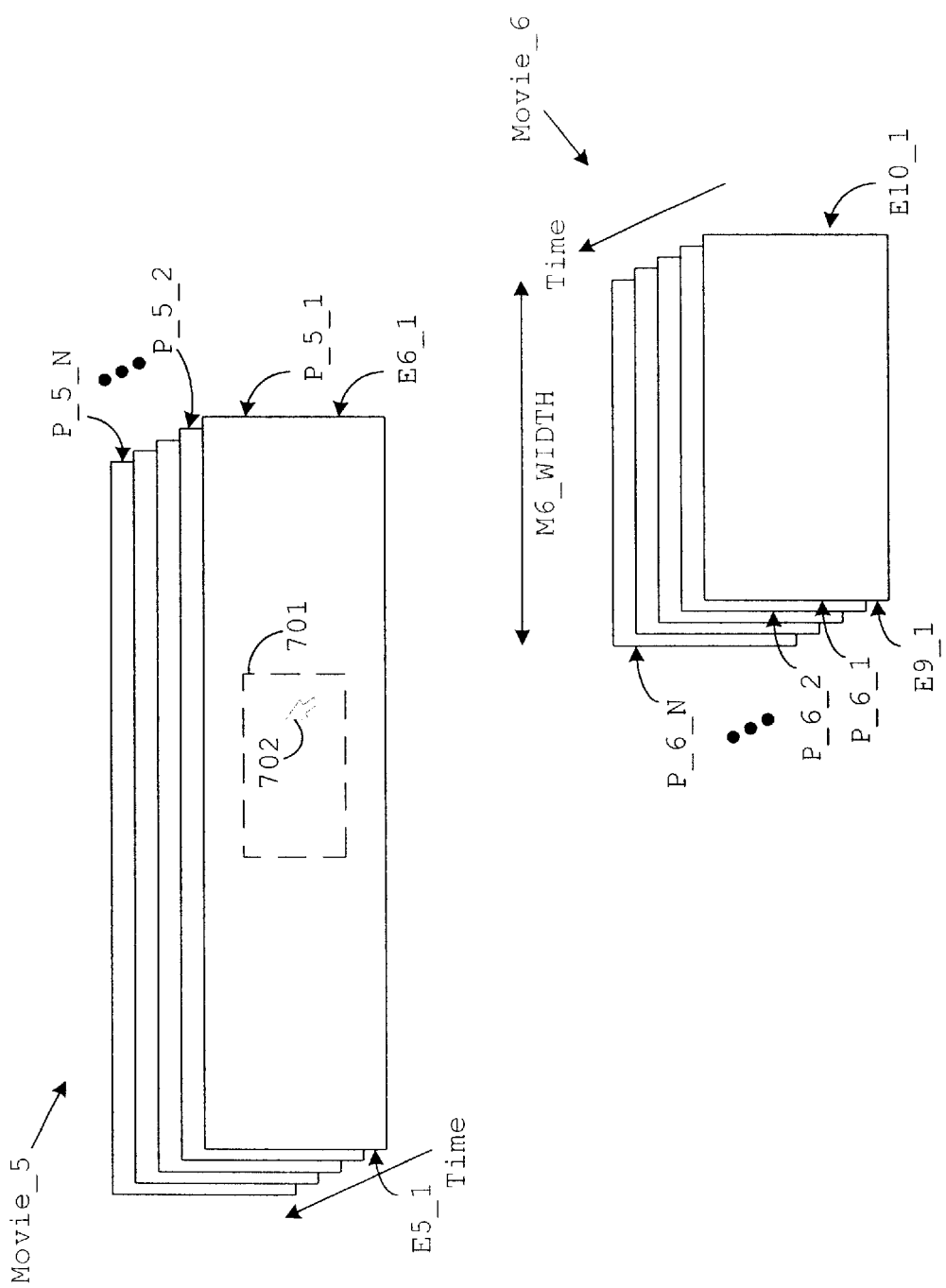
FIG. 7 is a two-dimensional representation of two time sequenced immersive videos in accordance with an embodiment of the present invention.

FIG. 7 is a two-dimensional representation of a two time sequenced immersive videos in accordance with an embodiment of the present invention. Movie Movie_5 is a 360° immersive video and movie MOVIE_6 is a M6_WIDTH immersive video, where M6_WIDTH is twice the width of view window 701. (Note that according to other embodiments of the invention, $M6_{13}$ WIDTH can be greater than twice the width of view window 701. Because movie MOVIE_6 is twice the width of view window 701, movie MOVIE_6 can be displayed in place of movie MOVIE_5 in the vicinity of the seam formed by edges E5_1 and E6_1, thereby eliminating the need to generate seams in movie MOVIE_5 real-time. Movies MOVIE_5 and MOVIE_6 include N (e.g. N=30) sequential immersive pictures each, immersive pictures P_5_1-P_5_N and P_6_1-P_6_N, respectively. Immersive picture P_5_2 is one time step (e.g. one-thirtieth of a second) behind immersive picture P_5_1 (i.e. immersive picture P_2, FIG. 2A). Because each picture P_6_1-P_6_N in movie MOVIE_6 is smaller than each picture P_5_1-P_5_N in movie MOVIE_5, movie MOVIE_6 beneficially requires less memory for storage and playback. According to an embodiment of the invention, the center of each immersive picture in movie MOVIE_6 overlaps a seam of movie MOVIE_5.

Figure 8:
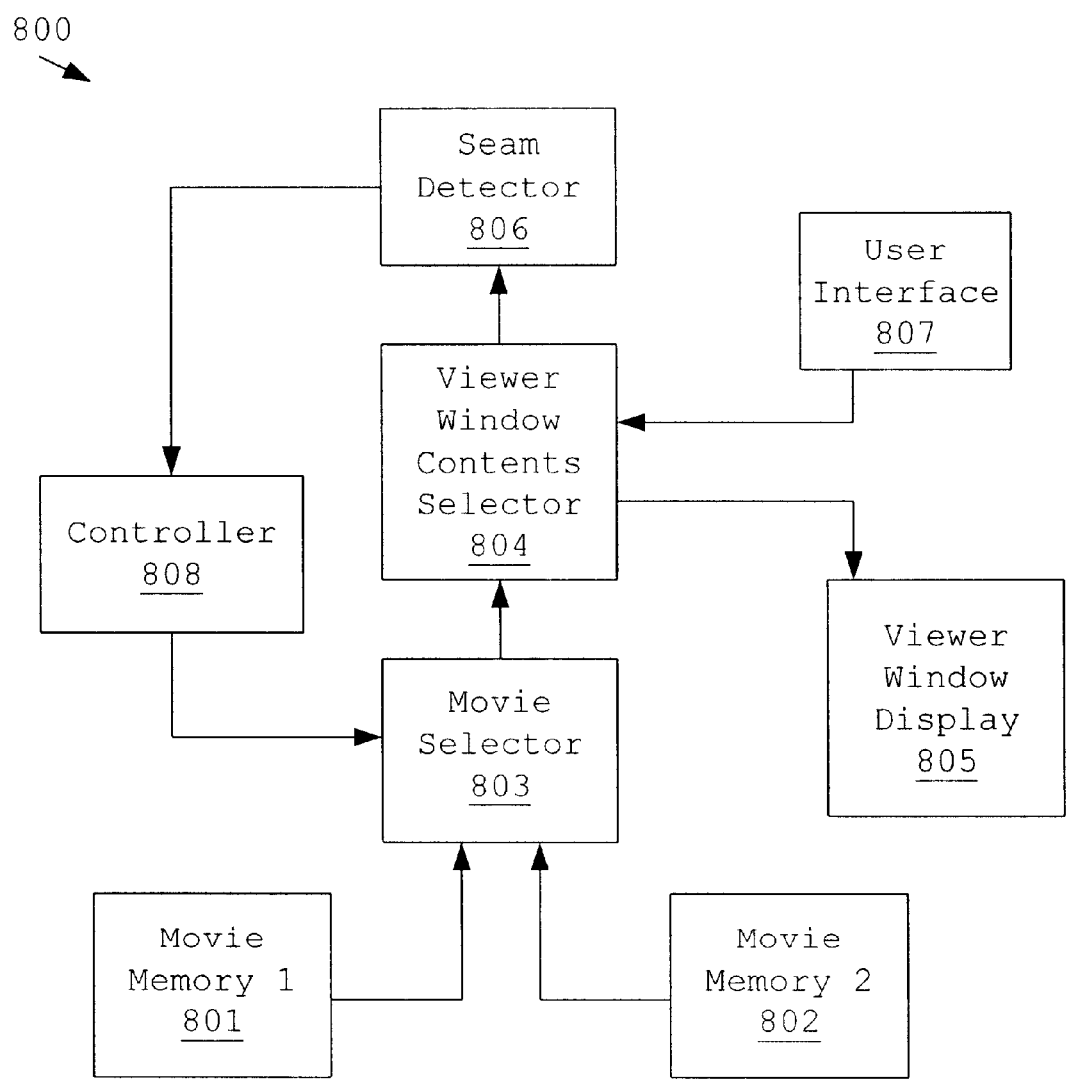
FIG. 8 is a block diagram of a system implementing an immersive video display system in accordance with an embodiment of the present invention.

FIG. 8 is a block diagram of a system 800 implementing an immersive video display system in accordance with an embodiment of the present invention. System 800 includes a first movie memory 801 and a second movie memory 802 for storing movies. In one embodiment, the movies are a video stream. Movie Selector 803 selects a movie to be displayed, choosing between simultaneously playing movies.

Once a movie has been selected for display, View Window Contents Selector 804 determines which portion of the displayed movie will appear in the field of view of the user. That portion is displayed in View Window Display 805. User Interface 807 provides control of the field of view to the user. Thus, User Interface 807 (e.g. mouse or joystick) allows the user to pan the view window around the displayed movie. Seam Detector 806 determines when the view window reaches a transition edge (e.g. a distance $D_1\_E4$ from edge $E4\_2$ in FIG. 6B at which the view window changes from displaying a portion of one movie to displaying a portion of another movie) of the currently displayed movie. When the user pans to a transition edge of the currently displayed movie, Controller 808 is alerted to change the selected movie. Thus, Controller 808 signals Movie Selector 803 to display a different simultaneously running movie. In this way, the user is allowed panning access to movies without seam distortion appearing in the field of view of view window display 805.

The various embodiments of the structures and methods of this invention that are described above are illustrative only of the principles of this invention and are not intended to limit the scope of the invention to the particular embodiments described. For example, in view of this disclosure, those skilled in the art can define other curved surfaces that are stored in two-dimensional memory, such as a sphere and so forth, and use these alternative surfaces to create a method or system according to the principles of this invention. Thus, the invention is limited only by the following claims.

APPENDIX I

Copyright (c) 2001 Enroute Inc.
All Rights Reserved
Macromedia ™ Flash Implementation of One Embodiment

```
Main
    actions for frame 1
        tmi="2";
        stop( );
    actions for frame 2
        startDrag ("dragControl", true);
        stop( );
    dragControl, (dragControl)
    Play Demo Button
        actions for Play Demo Button
        on (release) {
            play( );
        }
    logo
    low-res
    ENROUTE INC., (Times, 24 pts)
    slide object, (nav)
Symbol Definition(s)
    dragControl
        actions for frame 1
            speed=45;
            drag="/dragcontrol";
            /:w=getProperty("/nav",_width);
            /:xPos=getProperty(drag,_x);
            /:yPos=getProperty(drag,_y);
            /:xPos=/:xPos-(400/2);
            setProperty("/nav",_x,getProperty("/nav",_x)
                    -(/:xPos.speed) );
            if(Number(getProperty("/nav",_x) )<
                    Number(-(/:w/2) ) ) {
                setProperty("/nav",_x, 0.01);
            } else if(Number (getProperty("/nav",_x) )>0 {
                setProperty("/nav",_x,-/:w/2);
            }
        actions for frame 2
            gotoAndPlay(_currentframe-1);
Play Demo Button
logo
low-res
```

APPENDIX I-continued

Copyright (c) 2001 Enroute Inc.
All Rights Reserved
Macromedia ™ Flash Implementation of One Embodiment

```
slide object
    actions for frame 1
        m=0;
        while(Number(m)<Number( (/:tmi*2)-1) ) {
            m=Number(m)+1;
            dup="butn" add m;
            duplicateMovieClip("butn",dup,Number(m)+10);
            setProperty(dup,_x,Number(getProperty(dup,_x) )+
                    Number(m*getProperty(dup,_width) ) );
        }
    Immersive Video,  (butn)
Immersive Video
    Sequenced Images
Sequenced Images
```

What is claimed is:

1. A method for panning around an immersive movie, the method comprising:
   sequentially playing a first set of immersive pictures as a first movie;
   sequentially playing a second set of immersive pictures as a second movie, wherein the first and second movies are simultaneously played, and wherein a portion of the second movie overlaps a portion of the first movie including a seam of the first movie, the portion of the second movie and the portion of the first movie having identical picture content;
   selecting the first movie to be displayed as the immersive movie;
   defining a view window within the immersive movie;
   moving the view window with respect to the immersive movie; and
   selecting the second movie to be displayed as the immersive movie when the view window reaches a predetermined distance relative to the seam of the first movie.

2. The method of claim 1, wherein each immersive picture of the first set of immersive pictures has a 360 degree field of view.

3. The method of claim 2, wherein each immersive picture of the second set of immersive pictures has a field of view less than 360 degrees.

4. The method of claim 3, wherein each immersive picture of the second set of immersive pictures has a field of view less than 50 degrees.

5. The method of claim 1, wherein the view window has a field of view and each immersive picture of the second set of immersive pictures has a field of view greater than twice the field of view of the view window.

6. The method of claim 1, wherein a center of each immersive picture in the second set of immersive pictures overlaps a seam of the first set of immersive pictures.

7. The method of claim 1, wherein each immersive picture in the second set of immersive pictures is smaller than each immersive picture in the first set of immersive pictures.

8. The method of claim 1, wherein the view window is defined by a standard viewing software package.

9. The method of claim 8, wherein the standard viewing software package is Macromedia™ Flash.

10. The method of claim 1, wherein the immersive pictures define a cylindrical space.

11. The method of claim 1, wherein the immersive pictures are bitmaps.

12. The method of claim 1, wherein the immersive pictures are self-contained.

13. The method of claim 1, further comprising selecting the first movie to be displayed as the immersive movie when the view window reaches a predetermined location in the second movie.

14. A system for the display of immersive video comprising:
- a first movie memory;
- a second movie memory;
- a movie selector configured to receive a first movie from the first movie memory and a second movie from the second movie memory and choose the first movie or the second movie as a selected movie for display, wherein a portion of the second movie overlaps a portion of the first movie including a seam of the first movie, the portion of the second movie and the portion of the first movie having identical picture content;
- a view window display; and
- a view window contents selector configured to receive the selected movie and determine a portion of the selected movie for display in the view window display.

15. The system of claim 14, further comprising a user interface for directing the portion of the selected movie displayed by the view window contents selector.

16. The system of claim 14, further comprising a seam detector configured to receive a location of the view window with respect to an edge of the selected movie.

17. The system of claim 16, further comprising a controller configured to receive a signal from the seam detector indicating proximity to an edge, wherein the controller causes the movie selector to choose the non-selected movie for display.

* * * * *